United States Patent [19]

Hayano

[11] Patent Number: 4,941,141

[45] Date of Patent: Jul. 10, 1990

[54] TIME DIVISION SWITCHING FOR MULTI-CHANNEL CALLS USING TWO TIME SWITCH MEMORIES ACTING AS A FRAME ALIGNER

[75] Inventor: Shin-ichiro Hayano, Tokyo, Japan

[73] Assignee: NEC Corporation, Tokyo, Japan

[21] Appl. No.: 291,673

[22] Filed: Dec. 29, 1988

[30] Foreign Application Priority Data

Dec. 29, 1987 [JP] Japan .................................. 62-336027
Dec. 29, 1987 [JP] Japan .................................. 62-336028

[51] Int. Cl.$^5$ ............................. H04J 3/02; H04J 3/06
[52] U.S. Cl. ................................. 370/58.1; 370/100.1; 370/68; 370/66
[58] Field of Search ..................... 370/58, 60, 100, 59, 370/68, 61

[56] References Cited

U.S. PATENT DOCUMENTS

| | | | |
|---|---|---|---|
| 4,320,501 | 3/1982 | Le Dieu et al. | 370/68 |
| 4,500,986 | 2/1985 | Carver | 370/59 |
| 4,570,258 | 2/1986 | McCracken | 370/58 |
| 4,759,010 | 7/1988 | Murata et al. | 370/58 |

Primary Examiner—Douglas W. Olms
Assistant Examiner—Min Jung
Attorney, Agent, or Firm—Foley & Lardner, Schwartz, Jeffery, Schwaab, Mack, Blumenthal & Evans

[57] ABSTRACT

Signals on an incoming highway of a time division switching system are written into an alternate one of first and second time switch memories and are sequentially read out of the other alternate one of the memories into the time slots of an outgoing highway of the system in accordance with a phase difference between incoming and outgoing frames and a time slot interchanging relationship between signals on the incoming highway and corresponding signals on the outgoing highway, so that the beginning of the outgoing frame coincides with one of the time slots of the incoming frame which is displaced from the beginning of the incoming frame by an amount equal to the detected phase difference. Alternatively, if the time slot of at least one signal of a multi-channel call on the incoming highway is later than the time slot of a corresponding signal on the outgoing highway, all signals of that multi-channel call are sequentially read out of the memories into a given outgoing highway so that they correspond to those on an incoming frame which is one frame prior to the one being written at the beginning of the given outgoing frame. If the time slots of all signals of a multi-channel call on the incoming highway are earlier than those of respectively corresponding signals on the outgoing highway, all signals of that multi-channel call are sequentially read out of the memories into an outgoing frame so that they correspond to those on an incoming frame which is being written at the beginning of the outgoing frame.

9 Claims, 14 Drawing Sheets

Fig. 1 *Prior Art*

*Fig. 4a*
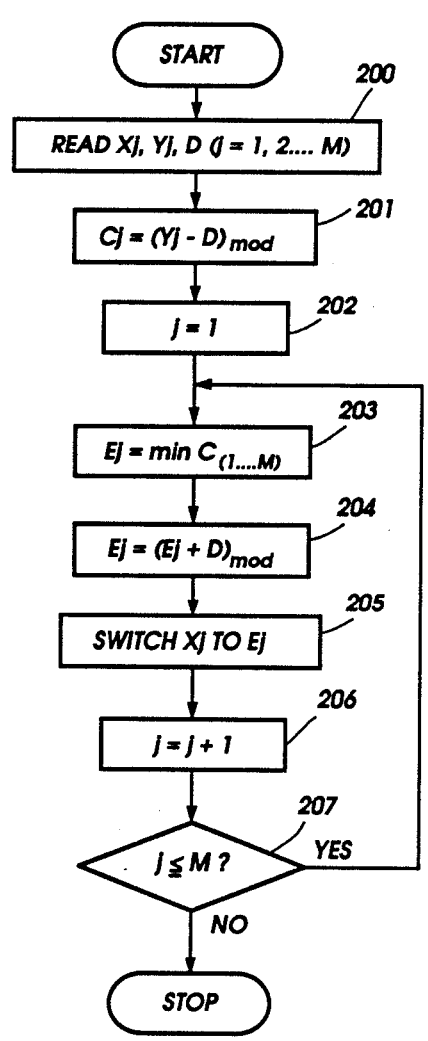
*Fig. 7*
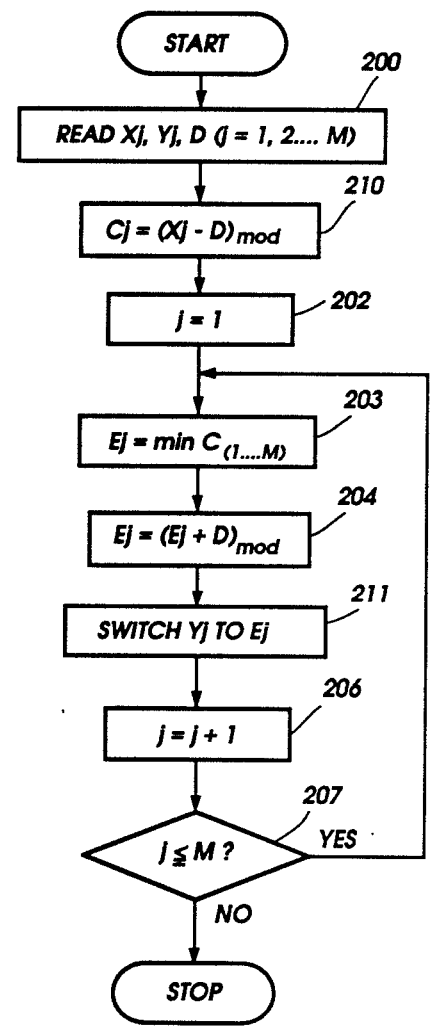
*Fig. 4b*
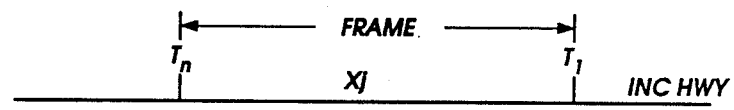
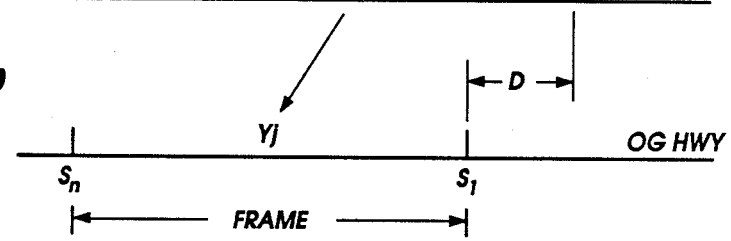

TIME DIVISION SWITCHING FOR MULTI-CHANNEL CALLS USING TWO TIME SWITCH MEMORIES ACTING AS A FRAME ALIGNER

BACKGROUND OF THE INVENTION

The present invention relates generally to a time division switching system for signals on multi-channel calls.

When switching multi-channel calls at multiples of the basic bearer speed, or basic traffic unit of the ISDN (integrated services digital network), it is required that signals on an outgoing highway must appear in the same sequence as they appear on the incoming highway, a requirement known as "time slot sequence integrity". To meet this requirement, the phase of a frame on incoming highways is rendered coincident with the phase of a corresponding frame on outgoing highways using two time switch memories 304 and 305 as shown in FIG. 1. This prior art time division switching system comprises a write-in counter 310 which provides the timing of the whole system. This counter is reset in response to a signal from a frame detector 309 at the beginning of an incoming frame on incoming highway 301. To switch the time slots #2 and #3 of a multi-channel call (b, c) are switched to time slots #1 and #4, the output of the write-in counter 310 is applied as an address signal to time switch memories 304 and 305 to write in signals on multi-channel calls ($b_1$, $c_1$) and ($b_2$, $c_2$) into the storage locations #2 and #3 of memories 304 and 305, respectively. Control circuit 320 writes in read address codes "2" and "3" into storage locations #1 and #4 of the control memory 321, respectively. To secure the time slot sequence integrity, control memory 321 must wait for the completion of write operation on a given frame before proceeding with the read operation of that given frame (see FIG. 2). However, the incoming and outgoing frames must be in phase alignment with each other in order to secure time slot sequence integrity. If multi-channel calls are handled by a switching system of a T×S×T (time-space-time switch) configuration in which the phase relationship between incoming and outgoing frames is predetermined, a memory such as first-in-first-out (FIFO) must be used as a frame aligner. This adds to hardware volume and complexity.

SUMMARY OF THE INVENTION

It is therefore an object of the present invention to provide a time division switching system for multi-channel calls which allows time division switching without the use of a frame aligner while maintaining time slot sequence integrity.

According to a first aspect, the time division switching system of the present invention comprises an incoming highway for supporting an incoming frame having time slots in which signals of the multi-channel calls are carried and an outgoing highway for supporting an outgoing frame having time slots in which corresponding signals of the multi-channels calls appear. First and second time switch memories are provided, each having memory locations corresponding to the time slots of each of the incoming and outgoing frames. Signals on the incoming highway are written into an alternate one of the first and second time switch memories and signals are sequentially read out of the other time switch memory into specified time slots of the outgoing highway in accordance with a phase difference between the incoming and outgoing frames and an interchanging relationship between signals on the incoming highway and corresponding signals on the outgoing highway, so that the beginning of the outgoing frame coincides with the one of the time slots of the incoming frame which is displaced from the beginning of the incoming frame by an amount equal to the phase difference.

According to a second aspect of the present invention, if the time slot of at least one signal of a given multi-channel call on the incoming highway is later than the time slot of a corresponding signal on the outgoing highway, all signals of the given multi-channel call are sequentially read into the time slots of a given outgoing highway from one of the first and second time switch memories in accordance with the phase difference and a time slot interchanging relationship between the incoming and outgoing frames so that the signals on the given outgoing frame correspond to those on an incoming frame which is one frame prior to the one being written into the other time switch memory at the beginning of the given outgoing frame. If the time slots of all signals of the given multi-channel call are earlier than the time slots of respectively corresponding signals on the outgoing highway, all signals of that multi-channel call of an incoming frame are sequentially read into the time slots of a given outgoing highway from one of the first and second time switch memories in accordance with the phase difference and a time slot interchanging relationship so that the signals on the given outgoing frame correspond to those on an incoming frame which is being written at the beginning of the given outgoing frame.

BRIEF DESCRIPTION OF THE DRAWINGS

The present invention will be described in further detail with reference to the accompanying drawings, in which:

FIG. 4a is a flowchart associated with the FIG. 3 embodiment, and FIG. 4b is a sketch associated with the flowchart of FIG. 4a;

FIG. 7 is a flowchart associated with the FIG. 6 embodiment;

FIG. 10a is a flowchart associated with the FIG. 9 embodiment and FIG. 10b is a sketch associated FIG. 10a;

DETAILED DESCRIPTION

Figure 1:
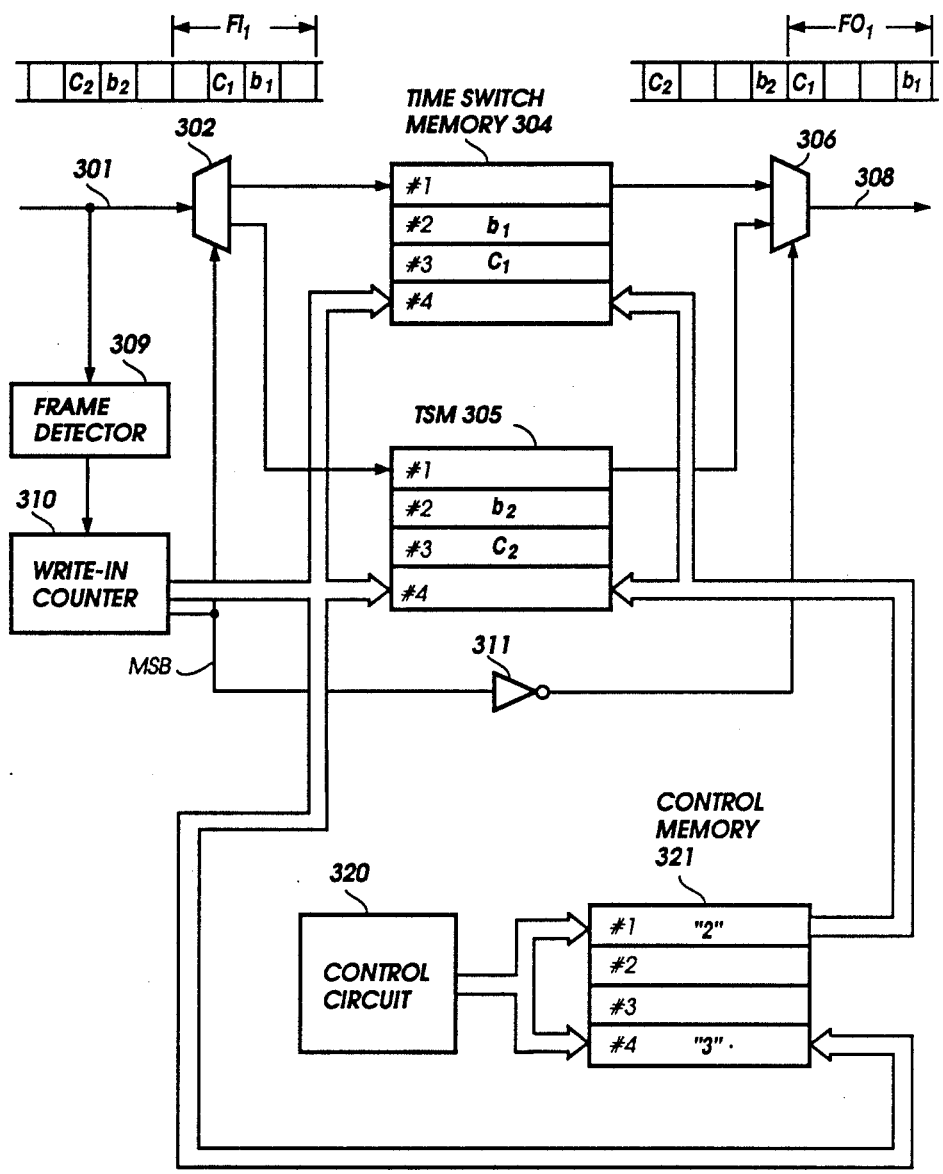
FIG. 1 is a block diagram of a prior art time division switching system.
Figure 2:
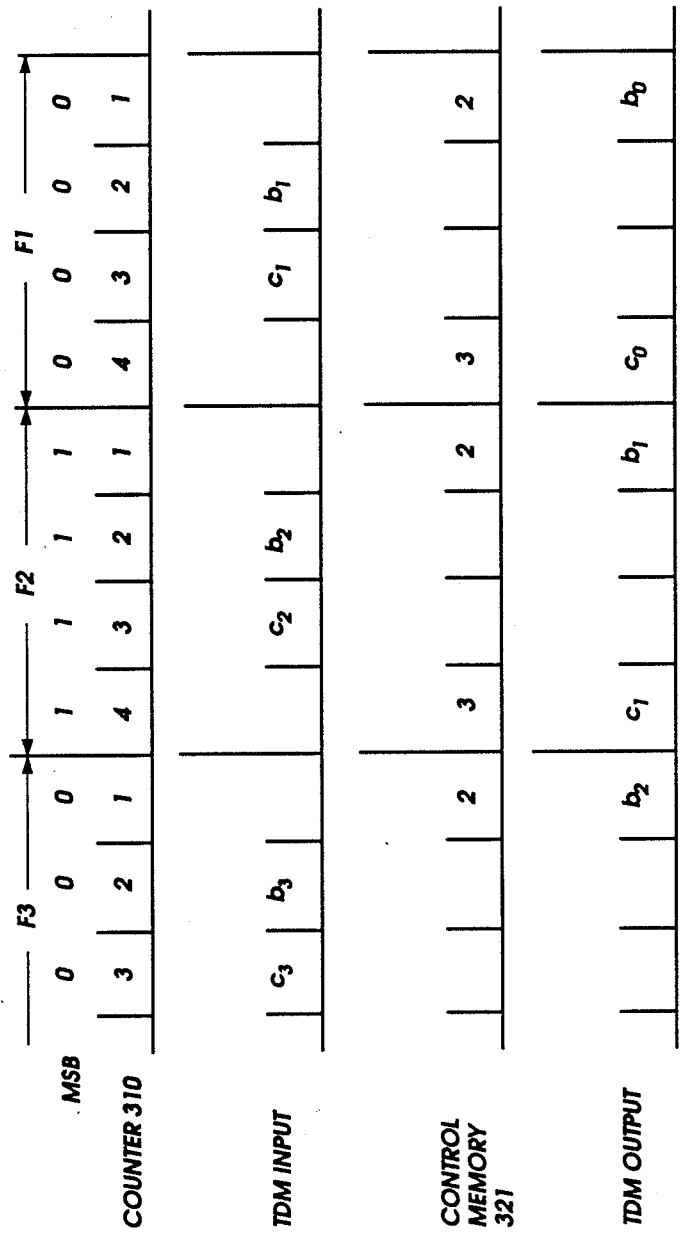
FIG. 2 is a timing diagram associated with FIG. 1.
Figure 3:
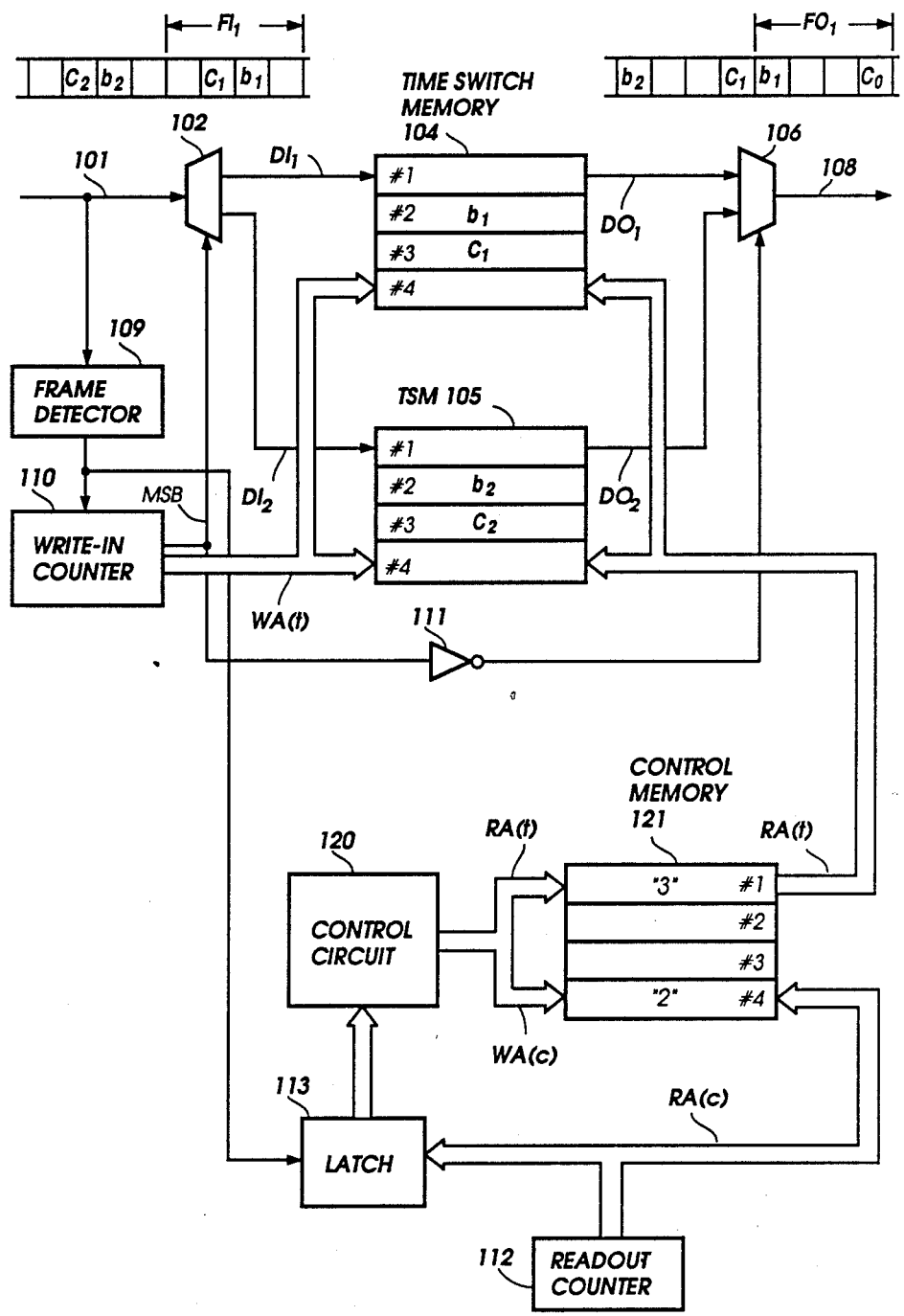
FIG. 3 is a block diagram of a time division switching system according to a first embodiment of the present invention.

In FIG. 3, there is shown a time division switching system according to an embodiment of the present invention. The switching system comprises an incoming highway 101, a demultiplexer 102 connected to the incoming highway 101, a first time switch memory 104 having a data input terminal $DI_1$ connected to a first output terminal of the demultiplexer 102, a second time switch memory 105 having a data input terminal $DI_2$ connected to a second output terminal of the demultiplexer 102, a multiplexer 106 having a first input terminal connected to an output terminal $DO_1$ of the first time switch memory 104 and a second input terminal connected to an output terminal $DO_2$ of the second time switch memory 105, and an outgoing highway connected to the output terminal of the multiplexer 106.

A frame detector 109 is connected to the incoming highway 101 to produce an output at the beginning of each incoming frame. Write-in counter 110 increments its count at intervals corresponding to the time slot intervals of incoming frames FI and is reset once for every two outputs from frame detector 109. The least significant bit to the second most significant bit of the counter 110 output are applied as a write address WA(t) to both of the time switch memories 104 and 105, the most significant bit being supplied to the control input of demultiplexer 102 as a memory space switching signal for switching the write-in timing of a memory space defined by the time switch memories 104 and 105 at times between successive incoming frames and further applied through a NOT circuit 111 to the control input of multiplexer 106 for switching the read timing of the memory space during the interval of each outgoing frame in a manner as will be understood later.

A readout counter 112 is provided, which increments its count at intervals corresponding to the time slot intervals of outgoing frames FO. The output of readout counter 112 is applied as a read address RA(c) to a control memory 121 as well as to a latch 113 where the read address is latched in response to an output from the frame detector 109. The latched data represents a phase difference between incoming and outgoing frames. A control circuit 120 derives a write address WA(c) for the control memory 121 and a read address RA(t) for the time switch memories 104 and 105 from the phase difference as well as from relationships between the individual time slots of an incoming frame and the time slots of a corresponding outgoing frame to which the signals on the incoming highway are to be switched. Read address RA(t) is stored into the control memory 121 in accordance with the write address WA(c) and read out of the control memory in accordance with the read address data RA(c) from readout counter 112 and supplied as a read address to time switch memories 104 and 105.

FIG. 4a is an illustration of an algorithm of the control circuit 120. As shown in FIG. 4b, incoming signals on highway 101 are designated as Xj (where j represents a time slot number ranging from 1 to M) and outgoing signals on highway 108 are designated as Yj. The interframe phase difference is indicated by D and the incoming frame extends between time slots $T_1$ and $T_n$ and the corresponding outgoing frame extends between time slots $S_1$ and $S_n$. The operation of the algorithm starts with block 200 which directs the reading of signals Xj, Yj, and D. Exit then is to operations block 201 which directs the modulo subtraction of Yj−D and designating the result as Cj. Control proceeds to operations block 202 which directs the setting of the parameter j to one and control proceeds to. Exit then is to operations block 203 which directs the finding of a minimum value of Cj among $C_1$ through $C_M$ and designating it as Ej. Control advances to operations block 204 to provide modulo summation of Ej and D, which is followed by operations block 205 which directs the connecting of Xj to Ej. Exit is to operations block 206 which increments the parameter j by one, which is compared with M in decision block 207 to determine if j is equal to or smaller than M. If the parameter j is smaller than M, the answer in block 207 is affirmative and control returns to block 203 to repeat the above process, and otherwise, it ends the process.

Figure 5:
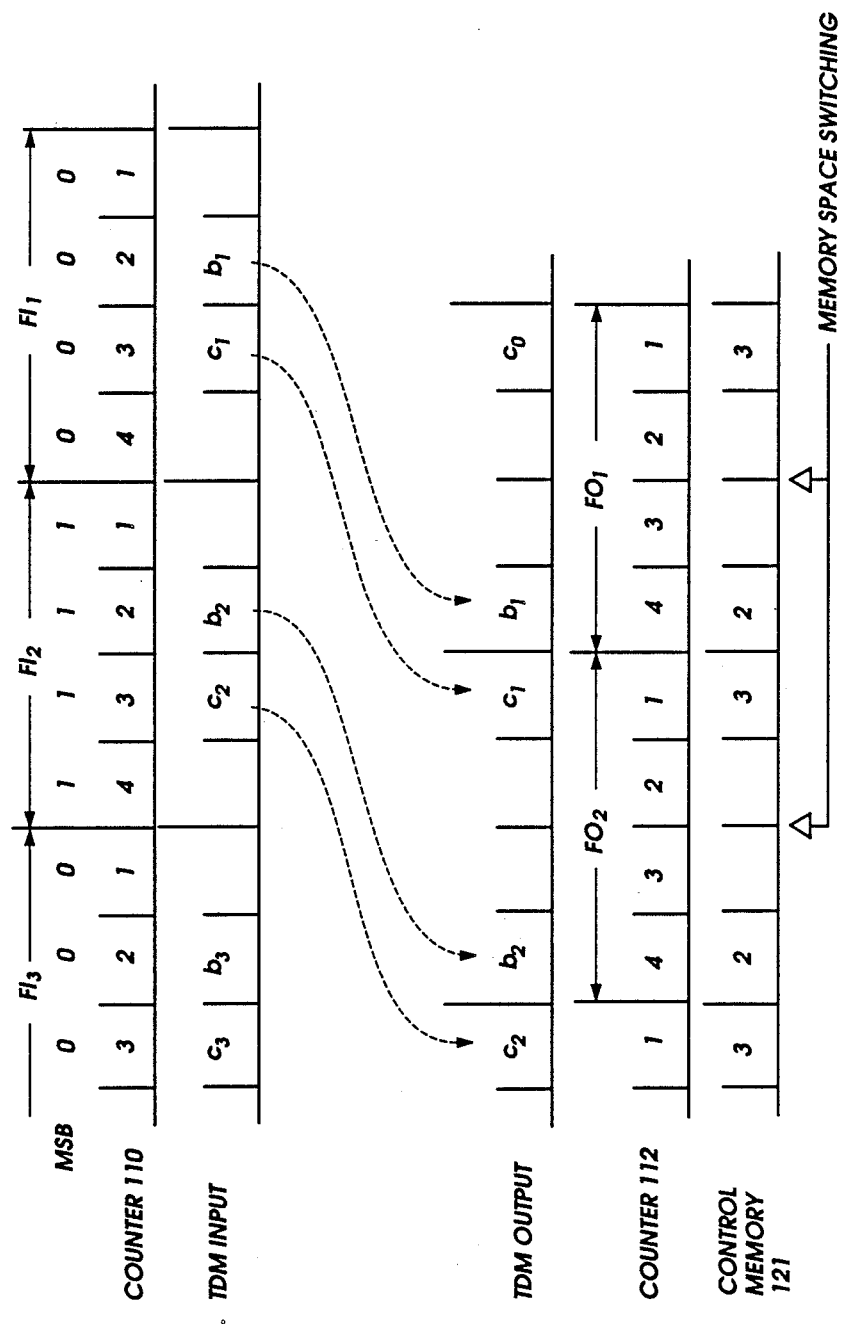
FIG. 5 is a timing diagram associated with the FIG. 3 embodiment.

The operation of the embodiment of FIG. 4a will be described with reference to a timing diagram shown in FIGS. 3 and 5. Assume that the switching system receives incoming frames $FI_1$ and $FI_2$ each carrying TDM signals b and c (each with a subscript identifying the frame in which they are carried) on the #2 and #3 time slots, respectively, on the incoming highway 101. It is further assumed that there is a phase difference of two time slots between the incoming and outgoing frames. This phase difference is detected by the latch 113 in response to an output of frame detector 109 at the beginning of the frame $FI_1$ and fed to the control circuit 120. Simultaneously, the write-in counter 110 is reset by the frame detector 109 output and supplied as a write address WA(t) to the time switch memories 104 and 105 so that TDM signals $b_1$ and $c_1$ are respectively stored into the #2 and #3 storage locations of time switch memory 104 and TDM signals $b_2$ and $c_2$ are respectively stored into the #2 and #3 storage locations of time switch memory 105.

With a phase difference D being equal to 2, and $X_1=2$, $X_2=3$, $Y_1=1$ and $Y_2=4$, the execution of block 201 gives a result that $C_1$ and $C_3$ are respectively equal to "3" and "2". In block 203, $E_1$ becomes equal to $C_2$, i.e., $C_2$ is detected as a minimum of the signals, $X_1=2$ is switched to $E_1=2+2=4$ in block 205. Likewise, $E_2$ is equal to C1, and therefore $X_2=3$ is switched to $E_2$ which is a modulo sum of $3+2=1$.

On the other hand, control circuit 120 determines that #4 time slot of frame $FO_1$ and #1 time slot of frame $FO_2$ are the destination (sink) slots from the phase difference as well as from a switching control signal supplied from an external source and proceeds to relate the incoming time slot #2 to outgoing time slot #4 and incoming time slot #3 to outgoing time slot #1 by writing a code "2" into the #4 storage location of control memory 121 and a code "3" into the #1 storage location of that memory.

Read operation is performed on one of the time switch memories 104 and 105 in accordance with the read address RA(t) from control memory 121 during the time write operation is being carried out on the other time switch memory. Memory space is switched in this way from one time switch memory to the other during the interval of an outgoing frame as marked by triangles in FIG. 5. More specifically, a TDM signal $c_0$ on an incoming frame that precedes frame $FI_1$ is read out of the storage location #3 of time switch memory 105 during the time slot #1 of outgoing frame $FO_1$ and TDM signal $b_1$ on incoming frame $FI_1$ is read out of the storage location #2 of time switch memory 104 during the time slot #4 of that outgoing frame. In this way, the incoming TDM signals $b_1$, $c_1$, $b_2$, $c_2$ can be switched to the #1 and #4 time slots of the outgoing highway 108, while retaining their order of occurrence.

Figure 6:
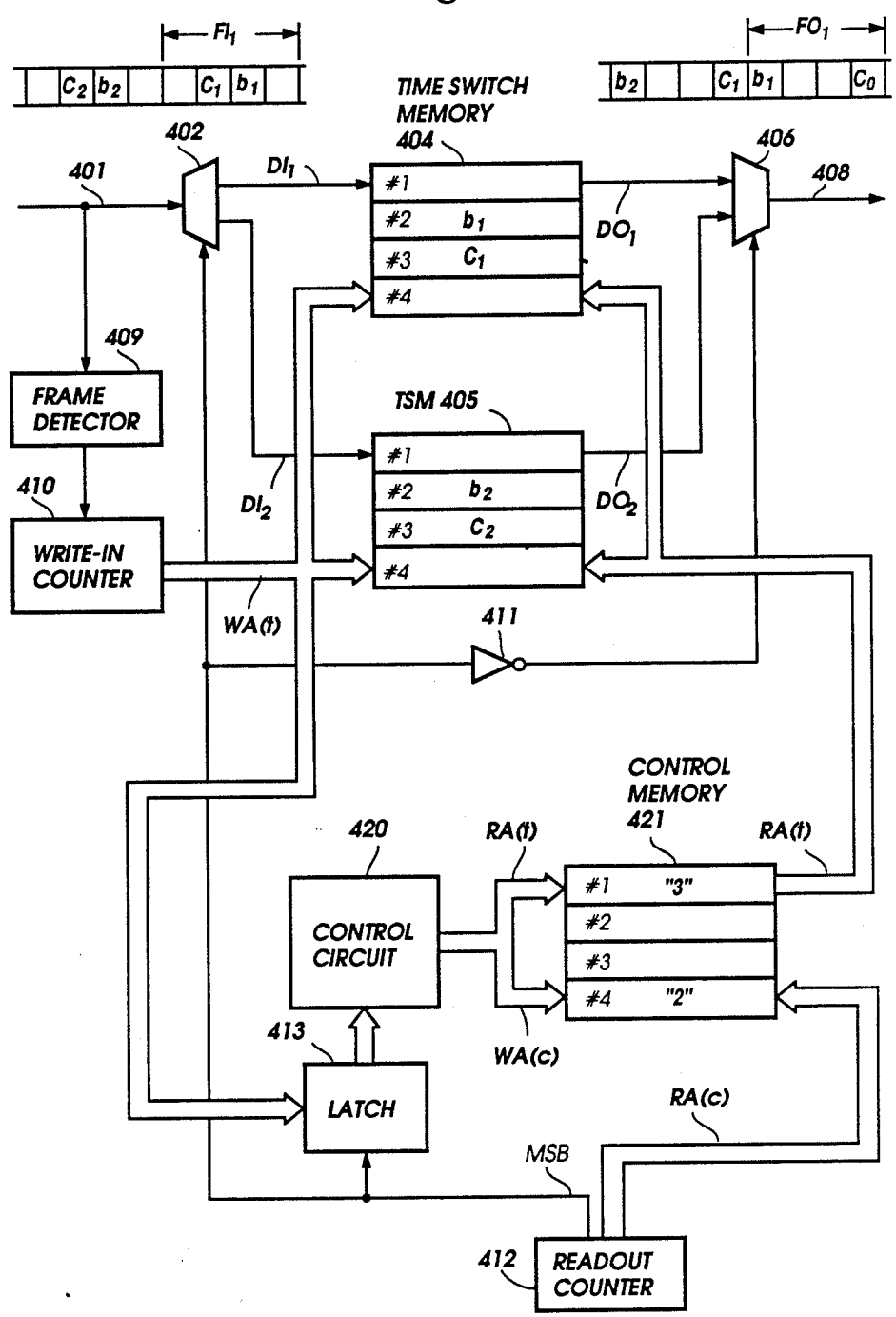
FIG. 6 is a block diagram of a time division switching system according to a second embodiment of the present invention.

A modified embodiment of the present invention is shown in FIG. 6. This embodiment comprises an incoming highway 401, a demultiplexer 402 connected to the incoming highway 401, a first time switch memory 404 having a data input terminal $DI_1$ connected to a first output terminal of the demultiplexer 402, a second time switch memory 405 having a data input terminal $DI_2$ connected to a second output terminal of the demultiplexer 402, a multiplexer 406 having a first input terminal connected to an output terminal $DO_1$ of the first time switch memory 404 and a second input terminal connected to an output terminal $DO_2$ of the second time switch memory 405, and an outgoing highway 408 connected to the output terminal of the multiplexer 406. A frame detector 409 is connected to the incoming highway 401 to produce an output at the beginning of each incoming frame. Write-in counter 410 increments its count at intervals corresponding to the time slot intervals of incoming frames FI and is reset in response to each output from the frame detector 409.

A readout counter 412 increments its count at intervals corresponding to the time slot intervals of outgoing frames FO. The second most significant bit to the least significant bit of the outputs of readout counter 412 are applied as a read address RA(c) to a control memory 421. The most significant bit of the output of readout counter 412 is applied to the demultiplexer 402 as a memory space switching signal for switching the write-in timing of a memory space defined by time switch memories 404 and 405 during the interval of each incoming frame and further applied through a NOT circuit 411 to the control input of multiplexer 406 for switching the read timing of the memory space at times between successive outgoing frames. This MSB output is also applied to a latch 413 to latch a write address WA(t) from the write-in counter 410 to produce an output representative of a phase difference between incoming and outgoing frames. A control circuit 420 derives a write address WA(c) for the control memory 421 and a read address RA(t) for the time switch memories 404 and 405 from the phase difference as well as from relationships between the individual time slots of an incoming frame and those time slots of an outgoing frame corresponding to that incoming frame. The read address RA(t) is stored into the control memory 421 in accordance with the write address WA(c) and read out of the control memory in accordance with the read address data RA(c) from readout counter 412 and supplied as a read address to time switch memories 404 and 405.

The algorithm of the control circuit 420 is shown in FIG. 7 which is similar to that of FIG. 4a with the exception that the blocks 201 and 205 of FIG. 4a are replaced with blocks 210 and 211. In block 210, modulo subtraction of $X_j - D$ is calculated and the modulo-subtraction is designated as $C_j$ and in block 211 $Y_j$ is switched to $E_j$.

With a phase difference D being equal to 2, and $X_1 = 2$, $X_2 = 3$, $Y_1 = 1$ and $Y_2 = 4$, the execution of block 210 gives a result that $C_1$ and $C_3$ are respectively equal to "4" and "1". In block 203, $E_1$ becomes equal to $C_2$, i.e., $C_2$ is detected as a minimum of the signals, $X_1 = 2$ is switched to $E_1 = 2 + 2 = 4$ in block 205. Likewise, $E_2$ is equal to $C_1$, and therefore $X_2 = 3$ is switched to $E_2$ which is a modulo sum of $3 + 2 = 1$.

Figure 8:
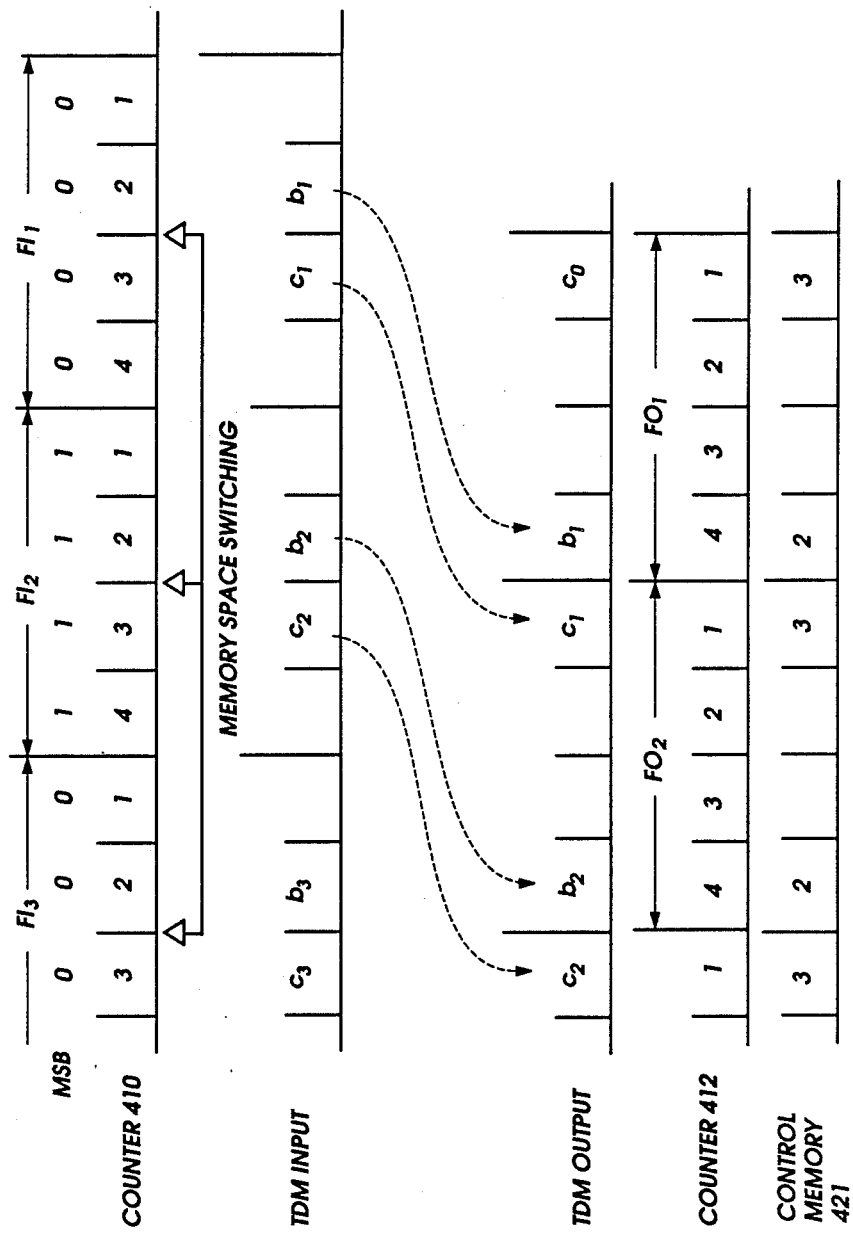
FIG. 8 is a timing diagram associated with the FIG. 6 embodiment.

In a manner similar to the previous embodiment, control circuit 420 relates incoming time slot #2 to outgoing time slot #4 and incoming time slot #3 to outgoing time slot #1 by writing a code "2" into the #4 storage location of control memory 421 and a code "3" into the #1 storage location of that memory. In this embodiment memory space switching between time switch memories 404 and 405 occurs during the interval of each incoming frame as marked by triangles in FIG. 8.

Even if there is a phase difference between incoming and outgoing frames, TDM signals can be switched without altering their sequence by the use of memories having the total capacity of two frames. It is seen that the time switch memories not only serve as a time slot interchanger but also serve as a frame aligner.

While mention has been made of a sequential-write-and-random-read mode of operation, a random-write-and-sequential-read mode of operation could equally be as well used in the present invention.

With the previous embodiments, time slot sequence integrity will be lost if at least one signal of a multi-channel call on the incoming highway is later than a corresponding signal on the outgoing highway.

Figure 9:
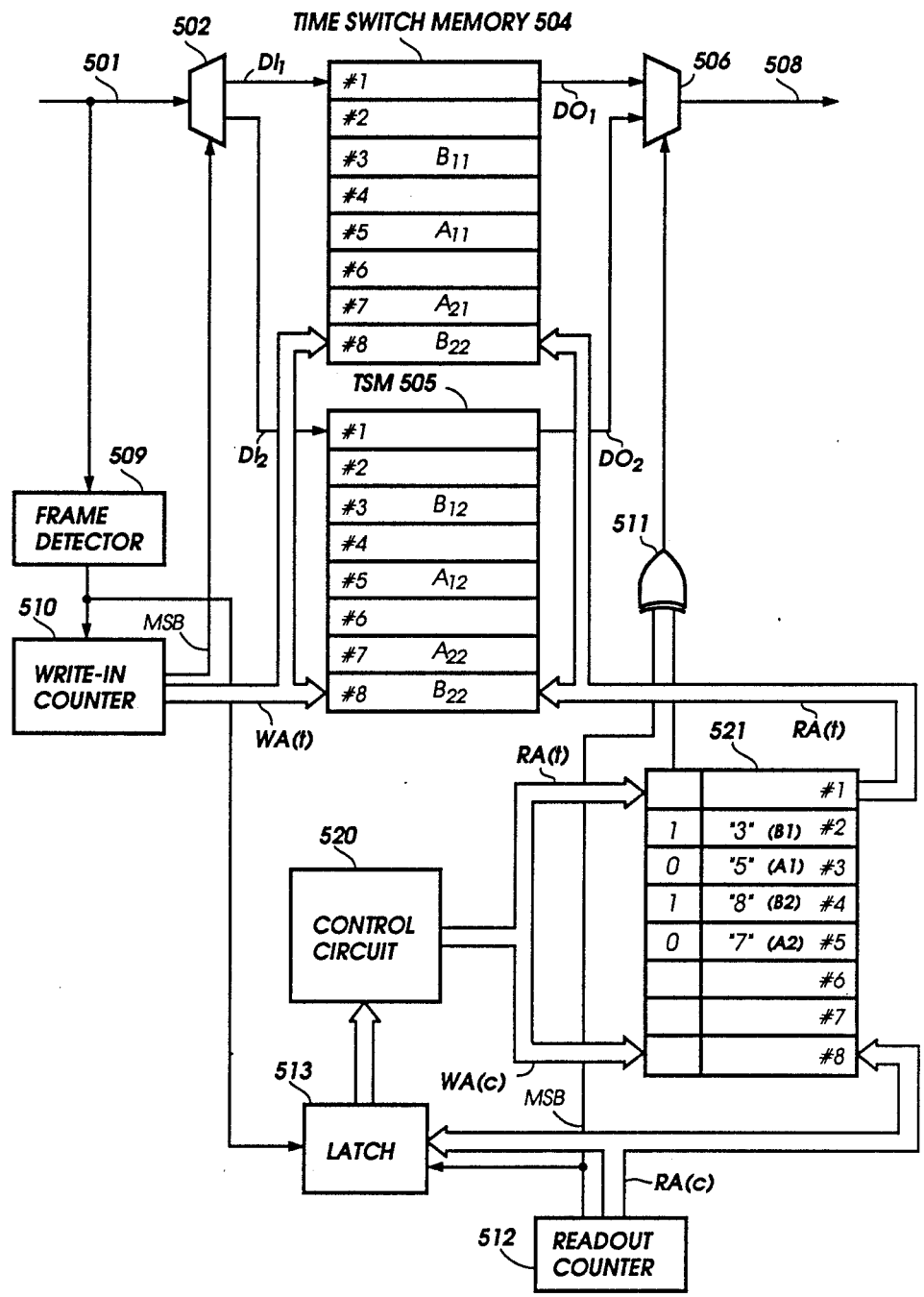
FIG. 9 is a block diagram of a time division switching system according to a third embodiment of the present invention.

A modified embodiment of the invention shown in FIG. 9 avoids this problem. Similar to the previous embodiments, the time division switching system of FIG. 9 comprises an incoming highway 501, a demultiplexer 502 connected to the incoming highway 501, a first time switch memory 504 having a data input terminal $DI_1$ connected to a first output terminal of the demultiplexer 502, a second time switch memory 505 having a data input terminal $DI_2$ connected to a second output terminal of the demultiplexer 502, a multiplexer 506 having a first input terminal connected to an output terminal $DO_1$ of the first time switch memory 504 and a second input terminal connected to an output terminal $DO_2$ of the second time switch memory 505, and an outgoing highway 508 connected to the output terminal of the multiplexer 506.

A frame detector 509 is connected to the incoming highway 501 to produce an output at the beginning of each incoming frame. A write-in counter 510 increments its count at intervals corresponding to the time slot intervals of incoming frames FI and is reset once for every two outputs from frame detector 509. The least significant bit to the second most significant bit of the counter 510 output are applied as a write address WA(t) to both of the time switch memories 504 and 505, the most significant bit being supplied to the control input of demultiplexer 502 as a memory space switching signal for switching the write-in timing of a memory space defined by the time switch memories 504 and 505.

A readout counter 512 increments its count at intervals corresponding to the time slot intervals of outgoing frames FO to produce a binary output, the second most significant bit to the least significant bit of the counter being applied as a read address RA(c) to a control memory 521 as well as to a latch 513. The most significant bit of the counter 512 output is applied to the latch 513 as well as to an exclusive-OR gate 511.

A control circuit 520 derives a write address WA(c) for the control memory 521 and a read address RA(t) for the time switch memories 504 and 505 from a switching control signal applied thereto and writes the read address codes RA(t) identifying incoming time slots into the storage locations of the control memory 521 which in turn respectively correspond to outgoing time slots.

All bits of the counter 512 output, which are stored in the latch 513, represent a phase difference between the incoming and outgoing frames. If the phase difference is less than a frame interval, the latched MSB is a binary 1 and if the phase difference is between a frame interval and a two-frame interval, the latched MSB is a binary 0. Control memory 521 has a plurality of control bit cells associated respectively to the individual storage locations of that memory to store a binary 1 or 0.

Figure 10A:
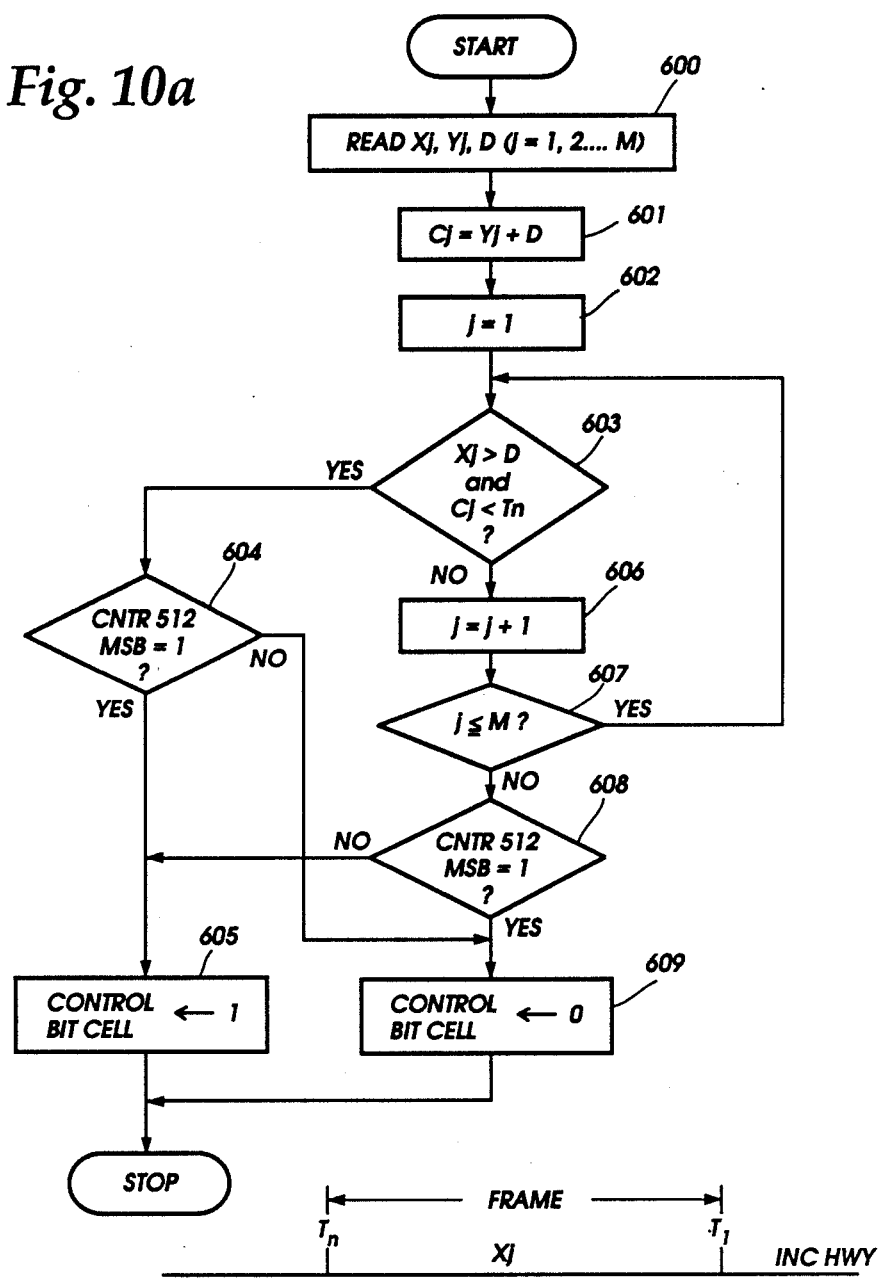
Figure 10B:
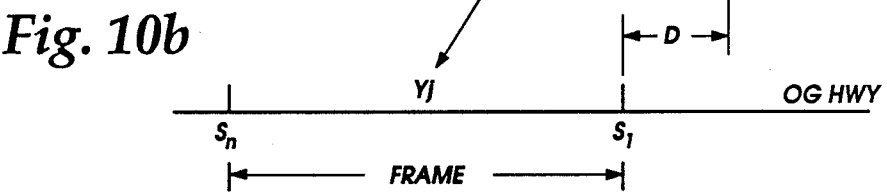

Control circuit 520 operates according to an algorithm which is shown in the form of a flowchart in FIG. 10a. Similar to FIG. 4b, incoming signals on highway 501 are designated as Xj (where j represents time slot numbers ranging from 1 to M) and outgoing signals on highway 508 are designated as Yj as shown in FIG. 10b. The interframe phase difference is indicated by D and the incoming frame extends between time slots $T_1$ and $T_n$ and the corresponding outgoing frame extends between time slots $S_1$ and $S_n$.

Program execution starts with operations block 600 which directs the reading of input data including signals Xj, Yj, and D. Exit is to block 601 which directs the modulo summing of the time slot number of outgoing signal Yj and the phase difference D to give a modulo-sum Cj. Control proceeds to operations block 602 in which signal sequence number j is initialized to one to begin processing with a first signal of each multi-channel call.

In decision block 603, control determines whether the time slot number of incoming signal Xj is greater than the phase difference D and at the same time if the modulo-sum Cj is smaller than the end time slot number $T_n$. This means that if the time slot number of at least one signal of a given incoming multi-channel call falls between $S_1$ and $T_n$ and if the time slot number of the corresponding signal on the outgoing highway also falls between $S_1$ and $T_n$, all the stored incoming signals of the given incoming call cannot be read without delay and must therefore be read in a subsequent outgoing frame interval. If this is the case, the decision in block 603 is affirmative and exit is to decision block 604 to determine if the phase difference is smaller than one frame or greater than one frame but smaller than two frames. If the phase difference is smaller than one frame, the counter 512 MSB output is 1 and control proceeds to operations block 605 to store a binary 1 into the control bit cell of memory 521. Otherwise, the MSB output is 0 and control proceeds to operations block 609 to store a binary 0 into the control bit cell of memory 521. If the decision in block 603 is negative, exit is to operations block 606 to increment j by one and control advances to decision block 607, which determines if j is equal to or smaller than M. Blocks 603, 606, and 607 are repeatedly executed until the variable j becomes equal to M. If all signals of an incoming multi-channel call and all the corresponding signals on the outgoing highway do not satisfy the conditions of decision block 603, and control exits to decision block 608 to determine if the phase difference is smaller than one frame or greater than one frame but smaller than two frames. As in the case of decision block 604, the MSB of counter 512 is a 1 if the phase difference is smaller than one frame and control proceeds to operations block 609 to store a 1 into the control bit cell of memory 521, and the MSB of counter 512 is a 0 if the phase difference is greater than one frame but smaller than two frames and control exits to operations block 605 to store a 0 into the control bit cell of memory 521.

Figure 11A:
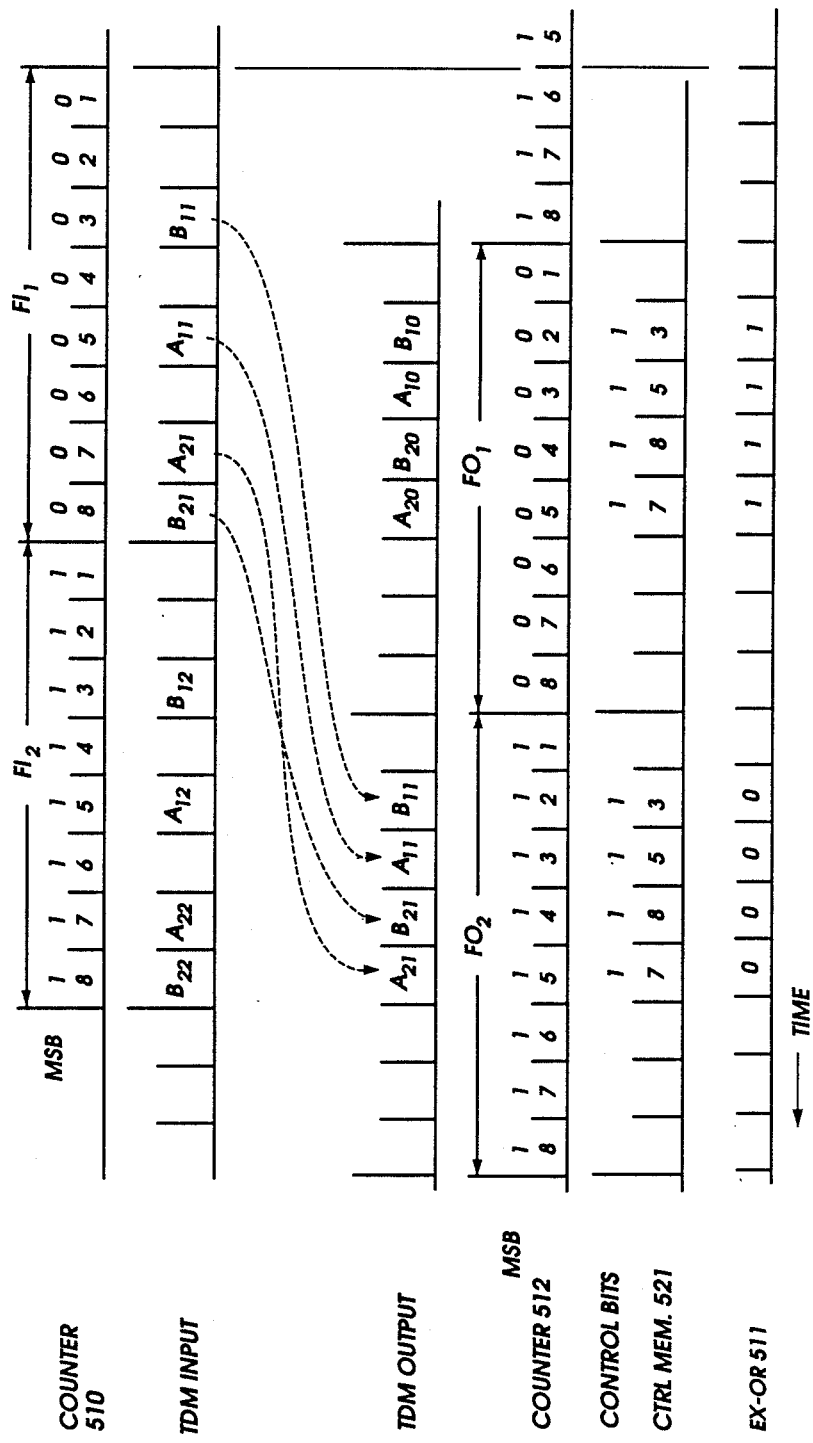
FIGS. 11a and 11b are timing diagrams associated with the FIG. 9 embodiment.
Figure 11B:
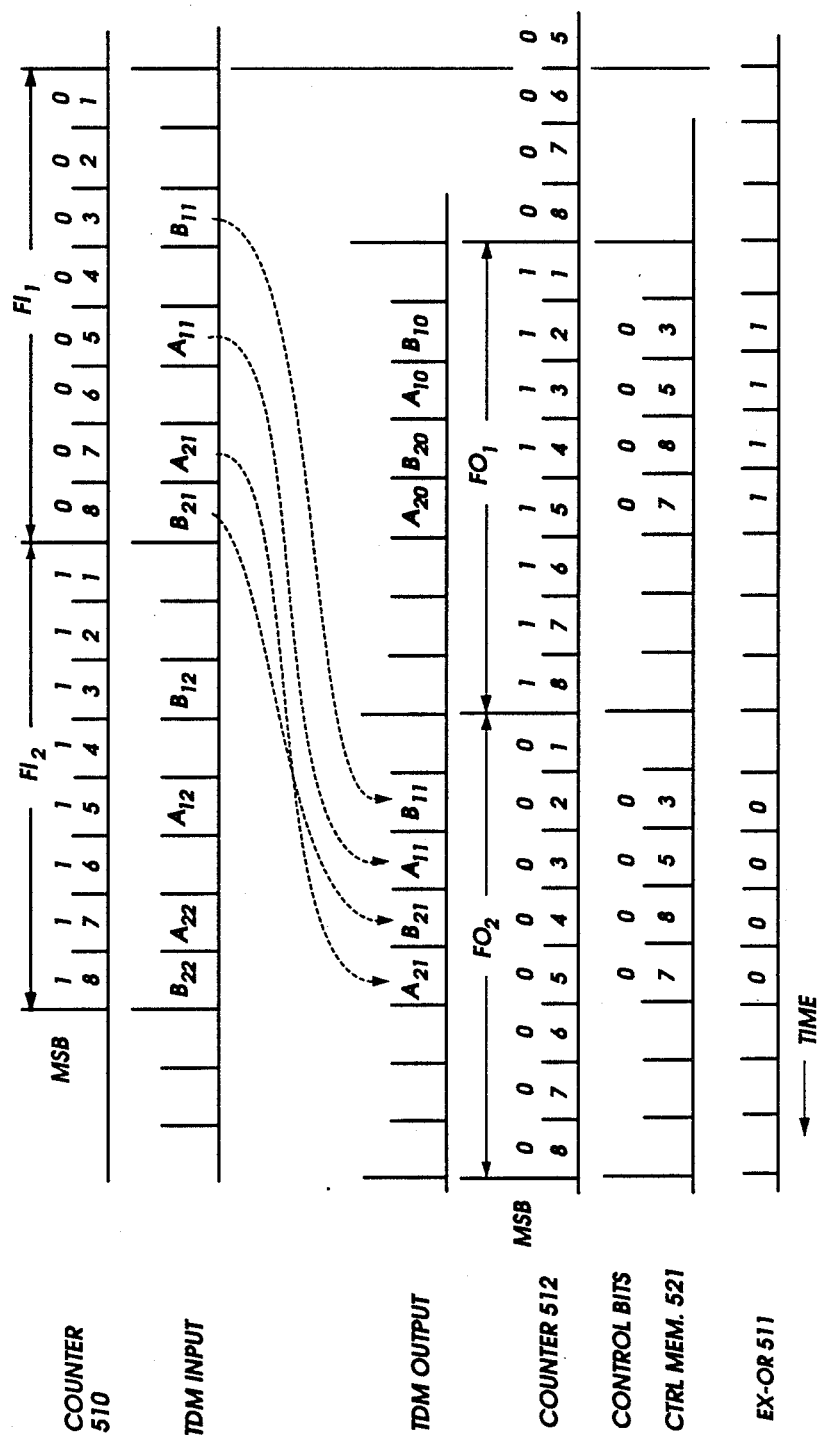

The operation of the flowchart of FIG. 10a will be better understood with reference to FIGS. 11a and 11b which respectively illustrate timing diagrams with a phase difference of three time slots and a phase difference of one-frame three time slots.

In FIG. 11a, it is assumed that incoming frames $FI_1$ and $FI_2$ each carry signals $A_1$ and $A_2$ of a multi-channel call A on #5 and #7 time slots and signals $B_1$ and $B_2$ of a multi-channel call B on #3 and #8 time slots, and incoming time slots #5 and #7 are respectively switched to outgoing time slots #3 and #5 and incoming time slots #3 and #8 are respectively switched to outgoing two slots #2 and #4. Switching signals indicating the relationships between incoming and outgoing time slots and phase difference data are supplied to the control circuit 520 from an external source (block 600) to begin processing the multi-channel signals $A_1$ and $A_2$ in succession by executing blocks 601, 602 and 603. Thus, decisions for signal $A_1$ and $A_2$ are affirmative in block 603, resulting in the writing of a binary 1 into the control bit cells #3 and #5 of memory 521. In like manner, signals $B_1$ and $B_2$ are processed to give an affirmative decision in block 603 and a binary 1 is written into the control bit cells #2 and #4 of memory 521.

Control bits of "1111" are therefore stored into the control bit cells of memory 521 which are associated respectively with the #2, #3, #4 and #5 storage locations of memory 521 in response to the write address WA(c) together with the corresponding read address data RA(t) and read out of this memory in response to the read address RA(c) from the readout counter 512. The control bits are supplied to one input of an exclusive-OR gate 511 to which the MSB output of readout counter 512 is also applied and the read address RA(t) is supplied to the time switch memories 504 and 505. The output of exclusive-OR gate 511 is applied as a memory space switching signal to the multiplexer 506. The purpose of the exclusive-OR gate 512 is to alternately reverse the binary state of the memory space switching signal during successive frames in step with changes in binary level of the MSB of readout counter 512.

Since signal $B_{21}$ cannot be read during the outgoing frame $FO_1$, all signals $A_{11}$, $A_{21}$, $B_{11}$ and $B_{21}$ are read during the subsequent outgoing frame FO2 from the time switch memory 504 which now stores the signals of incoming frame $FI_1$. A sequence of "1111" bits is generated by exclusive-OR gate 511 during one outgoing frame and a sequence of "0000" bits is generated during a succeeding outgoing frame.

If the phase difference is greater than one frame interval but smaller than two-frame interval, the latched MSB output of counter 512 is a binary 0 at the beginning of the first incoming frame and it changes to binary 1 during outgoing frame $FO_1$ and then to binary 0 during outgoing frame $FO_2$ as shown in FIG. 11b. Control circuit 520 generates a binary-0 control bit for all signals $A_1$, $A_2$, $B_1$, and $B_2$ to signify that signals of multi-channel calls A and B be read with one frame delay. Thus, binary 0 is generated for outgoing time slots #2, #3, #4 and #5. In this way, the sequence of bits generated by exclusive-OR gate 511 during each outgoing frame is the same as in the case of the smaller-than-one-frame phase difference.

Figure 12:
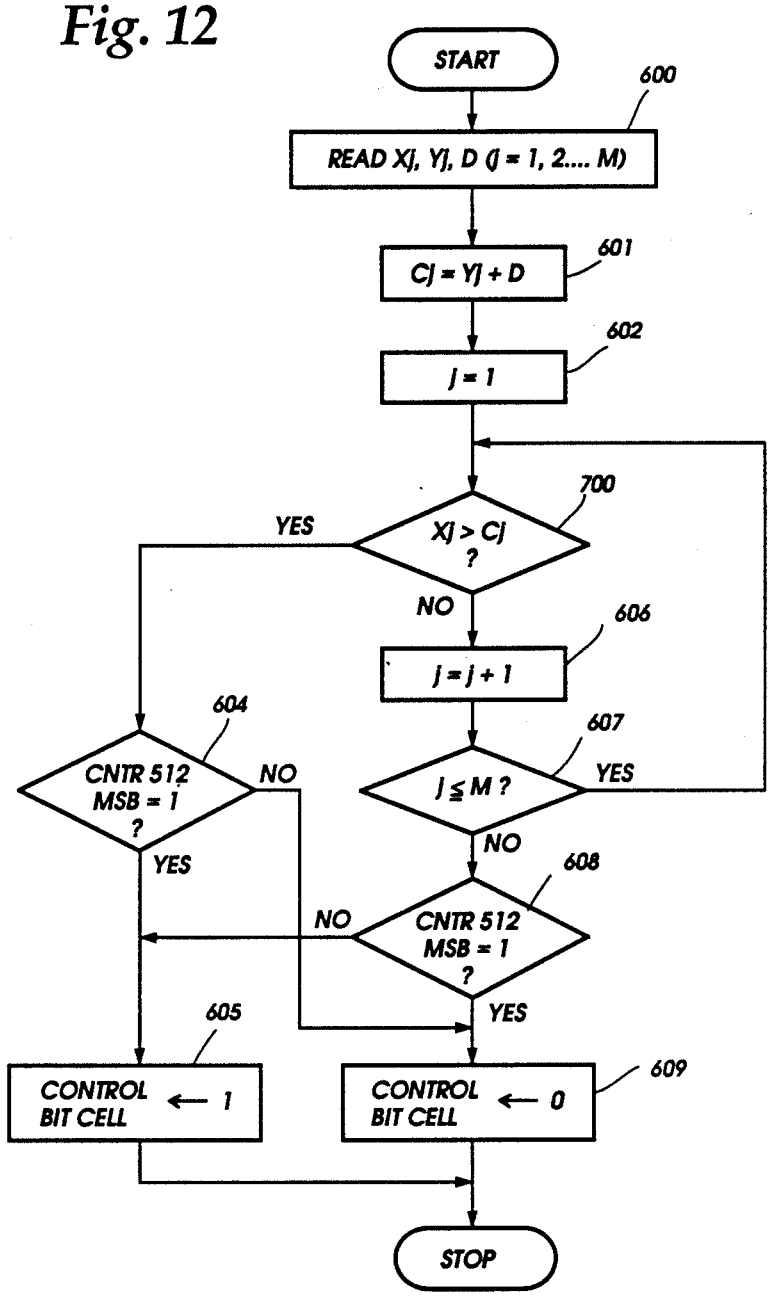
FIG. 12 is a flow chart associated with the FIG. 9 embodiment.

FIG. 12 is a flowchart of a modified form of the algorithm of FIG. 11a. The modified algorithm is similar to that of FIG. 11a with the exception that the decision block 603 of the previous embodiment is replaced with decision block 700 which determines whether Xj is greater than Cj.

Figure 13A:
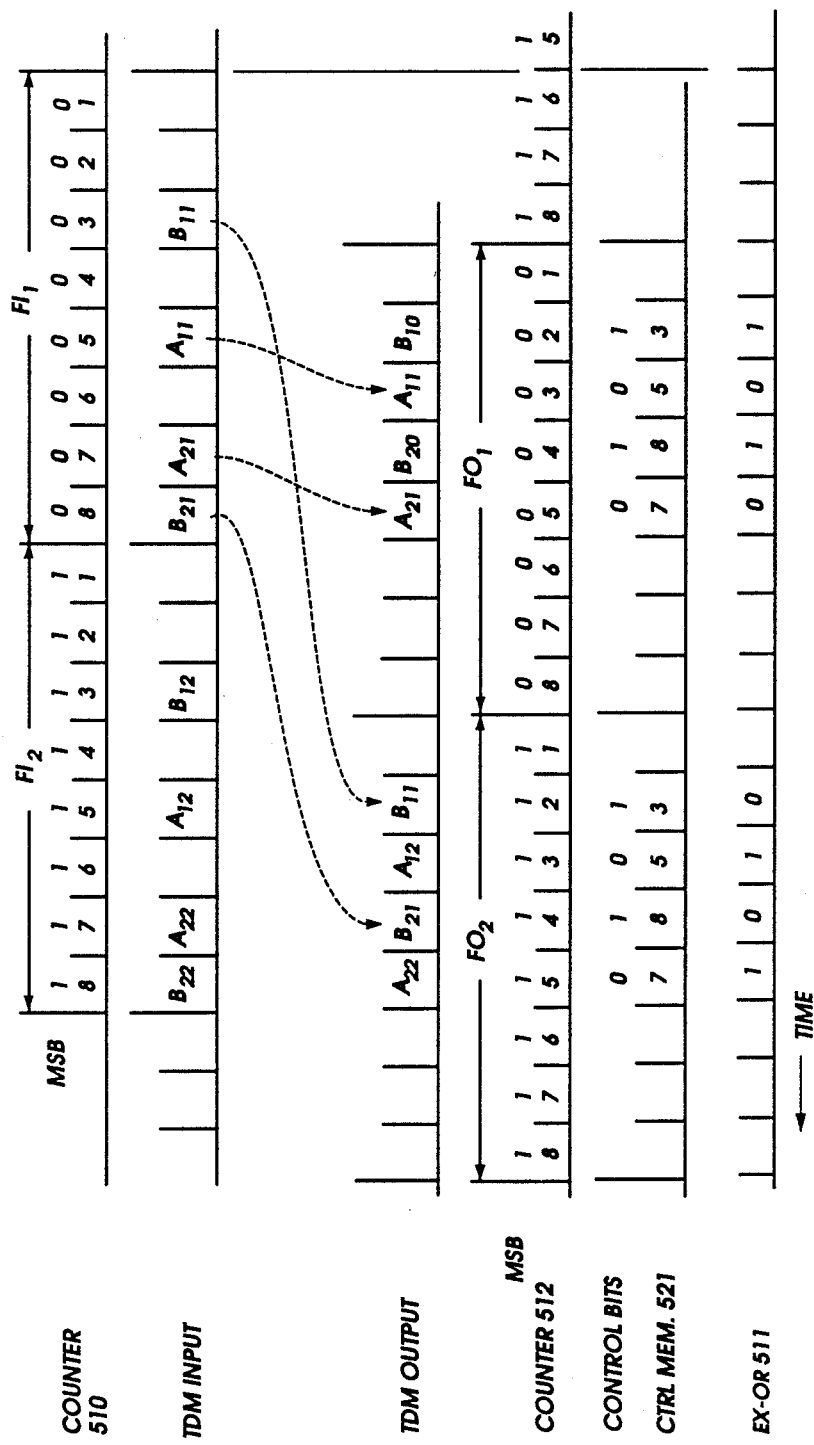
FIGS. 13a and 13b are timing diagrams associated with the FIG. 9 embodiment.
Figure 13B:
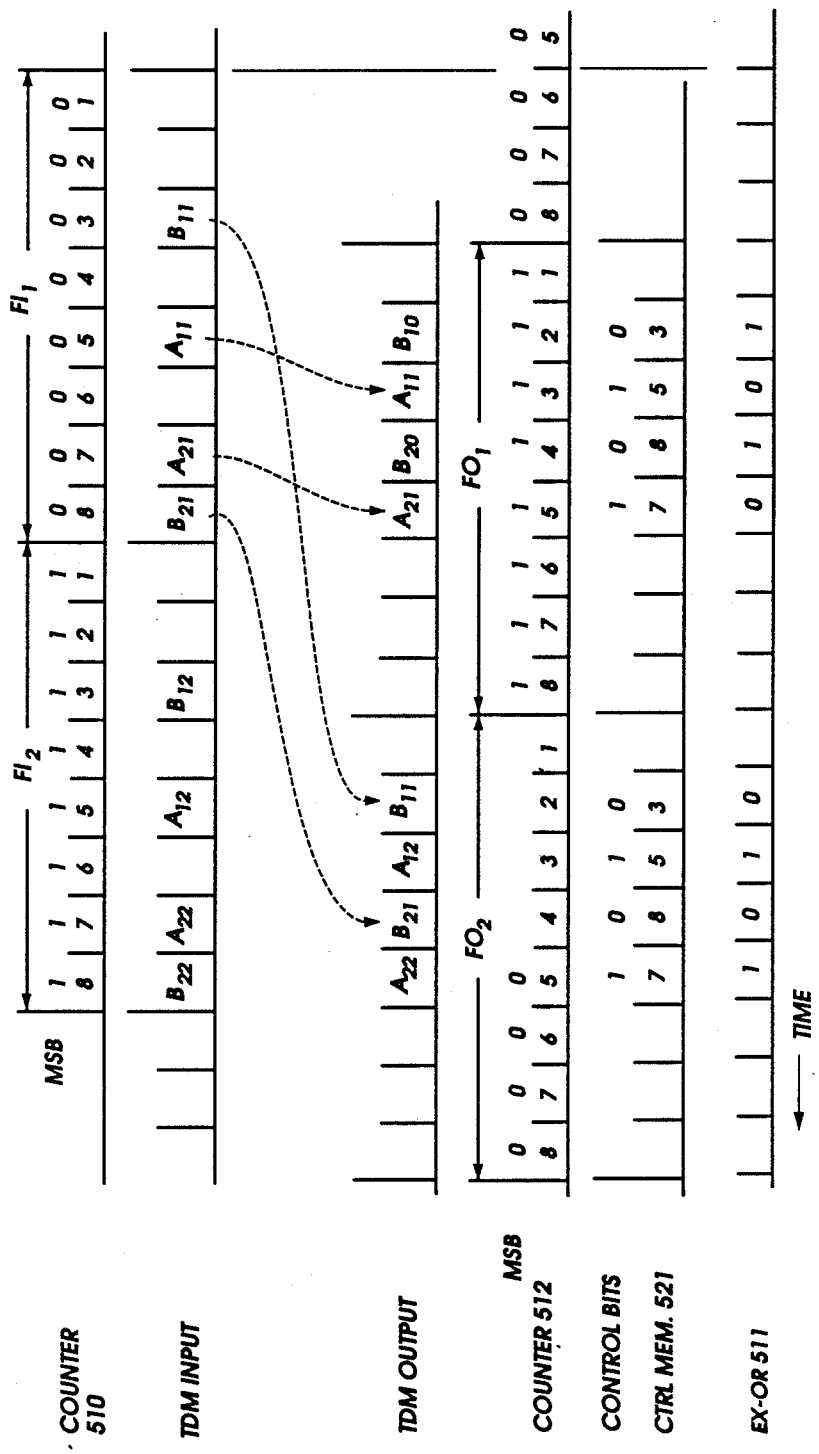

This algorithm will be understood with reference to FIGS. 13a and 13b which correspond respectively to FIGS. 11a and 11b. In FIG. 13a, the decision in block 700 for signals $A_1$ and $A_2$ is negative, resulting in the generation of a binary 0 for counter 512 MSB-1 and a binary 1 or the MSB-0 and the decision in block 700 is negative for signal $B_1$ and affirmative for signal $B_2$.

Control bits of "1010" are therefore stored into the control bit cells of memory 521 when the phase difference is smaller than one frame and control bits "0101" are stored into the control bit cells when the phase difference is greater than one frame but smaller than two frames (FIG. 13b). A sequence of "1010" bits is generated by exclusive-OR gate 511 during one outgoing frame and a sequence of "0101" bits is generated during a succeeding outgoing frame. Signals $A_{11}$ and $A_{21}$ are therefore read during the outgoing frame $FO_1$ from the time switch memory 504 which now stores the signals of incoming frame $FI_1$ and signals $B_{11}$ and $B_{21}$ are read during outgoing frame $FO_2$ from the same time switch memory.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A time division switching system for multi-channel calls, comprising:
   an incoming highway for supporting an incoming frame having time slots in which signals of said multi-channel calls are carried;
   an outgoing highway for supporting an outgoing frame having time slots in which corresponding signals of said multi-channels calls are carried;
   first and second time switch memories each having memory locations corresponding to the time slots of each of said incoming and outgoing frames;
   phase detector means for detecting a phase difference between said incoming and outgoing frames; and
   control means for writing signals on said incoming highway into one of said first and second time switch memories and reading signals from the other time switch memory into specified time slots of said outgoing highway in accordance with said phase difference and control data specifying addresses of said first and second time switch memories so that the beginning of said outgoing frame coincides with the one of said time slots of said incoming frame which is displaced from the beginning of said incoming frame by an amount equal to said detected phase difference.

2. A time division switching system for multi-channel calls, comprising:
   an incoming highway for supporting an incoming frame having time slots in which signals of said multi-channel calls are carried;
   an outgoing highway for supporting an outgoing frame having time slots in which corresponding signals of said multi-channels calls are carried;
   first and second time switch memories each having memory locations corresponding to the time slots of each of said incoming and outgoing frames;
   a frame detector connected to said oncoming highway for detecting the beginning of said incoming frame;
   means for supplying a write address to said first and second time switch memories in synchronism with the time slots of said incoming frame;
   a demultiplexer having an input terminal connected to said incoming highway and first and second output terminals connected respectively to input terminals of said first and second time switch memories, said demultiplexer alternately establishing a connection between said input terminal and one of said output terminals at frame intervals in response to the presence of a most significant bit of said write address;
   a multiplexer having first and second input terminals connected respectively to output terminals of said first and second time switch memories and an output terminal connected to said outgoing highway, said multiplexer alternately establishing a connection from one of said input terminals to said output terminal at frame intervals in response to the absence of said most significant bit of said write address;
   a control memory having memory locations corresponding to the time slots of each of said incoming and outgoing frames;
   means for generating a read address of said control memory in synchronism with the time slots of said outgoing frame;
   latch means for latching said read address as an indication of a phase difference between said incoming and outgoing frames in response to an output signal from said frame detector; and
   control means for writing a read address of said first and second time switch memories into said control memory in accordance with said latched address and a switching signal and reading signals from said first and second time switch memories in accordance with said read address of said control memory.

3. A time division switching system for multi-channel calls, comprising:
   an incoming highway for supporting an incoming frame having time slots in which signals of said multi-channel calls are carried;
   an outgoing highway for supporting an outgoing frame having time slots in which corresponding signals of said multi-channels calls are carried;
   first and second time switch memories each having memory locations corresponding to the time slots of each of said incoming and outgoing frames;
   a frame detector connected to said incoming highway for detecting the beginning of said incoming frame;
   means for supplying a write address to said first and second time switch memories in synchronism with the time slots of said incoming frame;
   a control memory having memory locations corresponding to the time slots of each of said incoming and outgoing frames;
   means for generating a read address of said control memory in synchronism with the time slots of said outgoing frame;
   a demultiplexer having an input terminal connected to said incoming highway and first and second output terminals connected respectively to input terminals of said first and second time switch memories, said demultiplexer alternately establishing a connection from said input terminal to one of said output terminals in response to the presence of a most significant bit of said read address of said control memory;

a multiplexer having first and second input terminals connected respectively to output terminals of said first and second time switch memories and an output terminal connected to said outgoing highway, said multiplexer alternately establishing a connection from one of said input terminals to said output terminal in response to the absence of said most significant bit of said read address of said control memory;

latch means for latching said write address of said first and second time switch memories as an indication of a phase difference between said incoming and outgoing frames in response to said most significant bit of said read address; and control means for writing a read address of said first and second time switch memories into said control memory in accordance with said latched address and a switching signal and reading signals from said first and second time switch memories in accordance with said read address of said control memory.

4. A time division switching system for multi-channel calls, comprising:

an incoming highway for supporting a series of incoming frames having time slots in which signals of said multi-channel calls are carried;

an outgoing highway for supporting a series of outgoing frames having time slots in which corresponding signals of said multi-channel calls are carried;

first and second time switch memories each having memory locations corresponding to the time slots of each said incoming and outgoing frames;

phase detector means for detecting a phase difference between said incoming and outgoing frames; and control means for (a) writing signals on said incoming highway into an alternate one of said first and second time switch memories, (b) making a decision if a time slot number of at least one signal of a given multi-channel call is greater than said phase difference and at the same time if a combined value of a time slot number of a corresponding signal on the outgoing highway and said phase difference is smaller than the highest time slot number of said incoming frames, and (c) in the absence of said decision, reading all signals of said given multi-channel call from one of said first and second time switch memories into specified time slots of a first outgoing frame which at least partially overlaps the incoming frame of said given multi-channel call in accordance with said phase difference and a switching signal and in the presence of said decision, reading all signals of said given multi-channel call from one of said time switch memories into said specified time slots of a second outgoing frame subsequent to said first outgoing frame in accordance with said phase difference and said switching signal.

5. A time division switching system for multi-channel calls, comprising:

an incoming highway for supporting a series of incoming frames having time slots in which signals of said multi-channel calls are carried;

an outgoing highway for supporting a series of outgoing frames having time slots in which corresponding signals of said multi-channels calls are carried;

first and second time switch memories each having memory locations corresponding to the time slots of each of said incoming and outgoing frames;

a frame detector connected to said incoming highway for detecting the beginning of said incoming frame;

means for supplying a write address to said first and second time switch memories in synchronism with the time slots of said incoming frame;

a demultiplexer having an input terminal connected to said incoming highway and first and second output terminals connected respectively to input terminals of said first and second time switch memories, said demultiplexer alternately establishing a connection from said incoming highway to one of said first and second output terminals in response to a most significant bit of said write address;

a control memory having first and second memory locations corresponding to the time slots of each of said incoming and outgoing frames;

means for generating a read address of said control memory in synchronism with the time slots of said outgoing frame;

latch means for latching said read address as an indication of a phase difference between said incoming and outgoing frames in response to an output signal from said frame detector; and control means responsive to said latched address and to a time slot interchanging relationship between said incoming and outgoing highways for ($a_1$) writing a read address of said first and second time switch memories into said first memory locations of said control memory, ($a_2$) writing a first binary signal into said second memory locations of said control memory if a condition is satisfied which states that an incoming signal of a multi-channel call is located between the beginning of a first outgoing frame and the end of a first incoming frame which at least partially overlaps the first outgoing frame and a corresponding outgoing signal in said first outgoing frame, if shifted by an amount equal to said phase difference toward a second, subsequent outgoing frame will be located between the beginning of said second outgoing frame and the end of a second, subsequent incoming frame, or generating a second signal when said condition if not satisfied, ($a_3$) writing a second binary signal into said second memory locations of said control memory if said condition is not satisfied, and (b) reading signals from said first and second memory locations of said control memory in accordance with said read address of said control memory;

exclusive-OR gate means for receiving said first and second binary signals from said control memory and a most significant bit of said read address of said control memory; and a multiplexer having first and second input terminals connected respectively to output terminals of said first and second time switch memories and an output terminal connected to said outgoing highway, said multiplexer alternately establishing a connection from one of said first and second input terminals to said outgoing highway in response to an output signal from said exclusive-OR gate means.

6. A time division switching system as claimed in claim 5, wherein said control means reverses the values of said first and second binary signals when said phase difference is greater than one-frame interval but smaller than two-frame interval.

7. A time division switching system for multi-channel calls, comprising:
an incoming highway for supporting a series of incoming frames having time slots in which signals of said multi-channel calls are contained;
an outgoing highway for supporting a series of outgoing frames having time slots in which corresponding signals of said multi-channel calls are carried;
first and second time switch memories each having memory locations corresponding to the time slots of each of said incoming and outgoing frames;
phase detector means for detecting a phase difference between said incoming and outgoing frames; and
control means for (a) writing signals on said incoming highway into an alternate one of said first and second time switch memories, (b) generating a first signal when the time slot of at least one signal of a given multi-channel call of a given incoming frame is later than the time slot of a corresponding signal on a corresponding outgoing frame, or a second signal when the time slots of all signals of said given multi-channel call on said given incoming frame are earlier than the time slots of respectively corresponding signals on said corresponding outgoing frame, and (c) reading all signals of said given multi-channel call from one of said first and second time switch memories into specified time slots of an outgoing frame subsequent to said corresponding outgoing frame in accordance with said phase difference and a switching signal in the presence of said first signal and reading all signals of said given multi-channel call from one of said time switch memories into said corresponding outgoing frame in accordance with said phase difference and said time slot interchanging relationship in the presence of said second signal.

8. A time division switching system for multi-channel calls, comprising:
an incoming highway for supporting a series of incoming frames having time slots in which signals of said multi-channel calls are carried;
an outgoing highway for supporting a series of outgoing frames having time slots in which corresponding signals of said multi-channel calls are carried;
first and second time switch memories each having memory locations corresponding to the time slots of each of said incoming and outgoing frames;
a frame detector connected to said incoming highway for detecting the beginning of said incoming frame;
means for supplying a write address to said first and second time switch memories in synchronism with the time slots of said incoming frame;
a demultiplexer having an input terminal connected to said incoming highway and first and second output terminals connected respectively to input terminals of said first and second time switch memories, said demultiplexer alternately establishing connection from said incoming highway to one of said first and second output terminals in the presence of a most significant bit of said write address;
a control memory having first and second memory locations corresponding to the time slots of each of said incoming and outgoing frames;
means for generating a read address of said control memory in synchronism with the time slots of said outgoing frame;
latch means for latching said read address as an indication of a phase difference between said incoming and outgoing frames in response to an output signal from said frame detector; and
control means responsive to said latched address and to a time slot interchanging relationship between said incoming and outgoing highways for (a₁) writing a read address of said first and second time switch memories into said first memory locations of said control memory, (a₂) writing a first binary signal into said second memory locations of said control memory if the time slot of at least one signal of a given multi-channel call on a given incoming frame is later than the time slot of a corresponding signal of a corresponding outgoing frame, (a₃) writing a second binary signal into said second memory locations of said control memory when the time slots of all signals of said given multi-channel call on said given incoming frame are earlier than the time slots of respectively corresponding signals on said corresponding outgoing frame, and (b) reading signals from said first and second memory locations of said control memory in accordance with said read address of said control memory;
exclusive-OR gate means for receiving said first and second binary signals from said control memory and a most significant bit of said read address of said control memory; and
a multiplexer having first and second input terminals connected respectively to output terminals of said first and second time switch memories and an output terminals connected to said outgoing highway, said multiplexer alternately establishing a connection from one of said first and second input terminals to said outgoing highway in response to an output signal from said exclusive-OR gate means.

9. A time division switching system as claimed in claim 8, wherein said control means reverses the values of said first and second binary signals when said phase difference is greater than one-frame interval but smaller than two-frame interval.

* * * * *